Sept. 6, 1938.　　　F. L. TALMAGE　　　2,129,451
FEEDER
Filed May 18, 1936　　　2 Sheets-Sheet 2
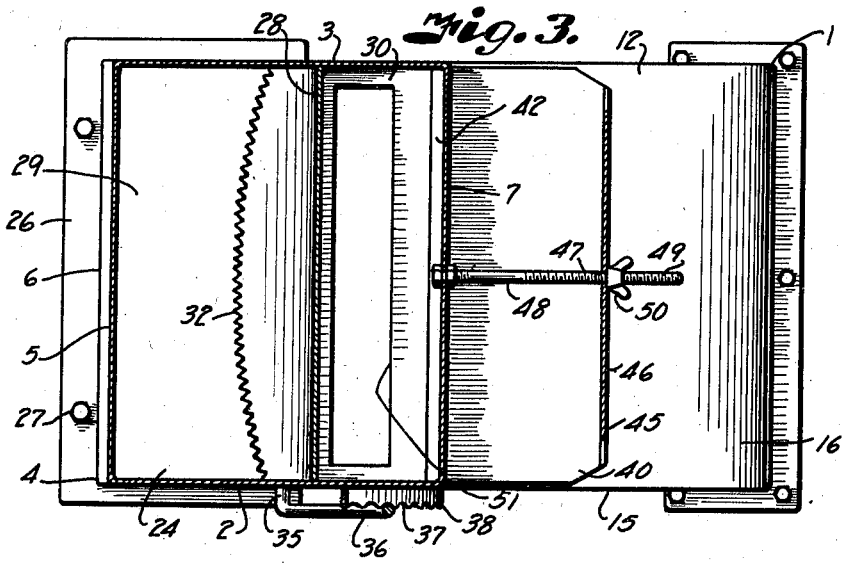
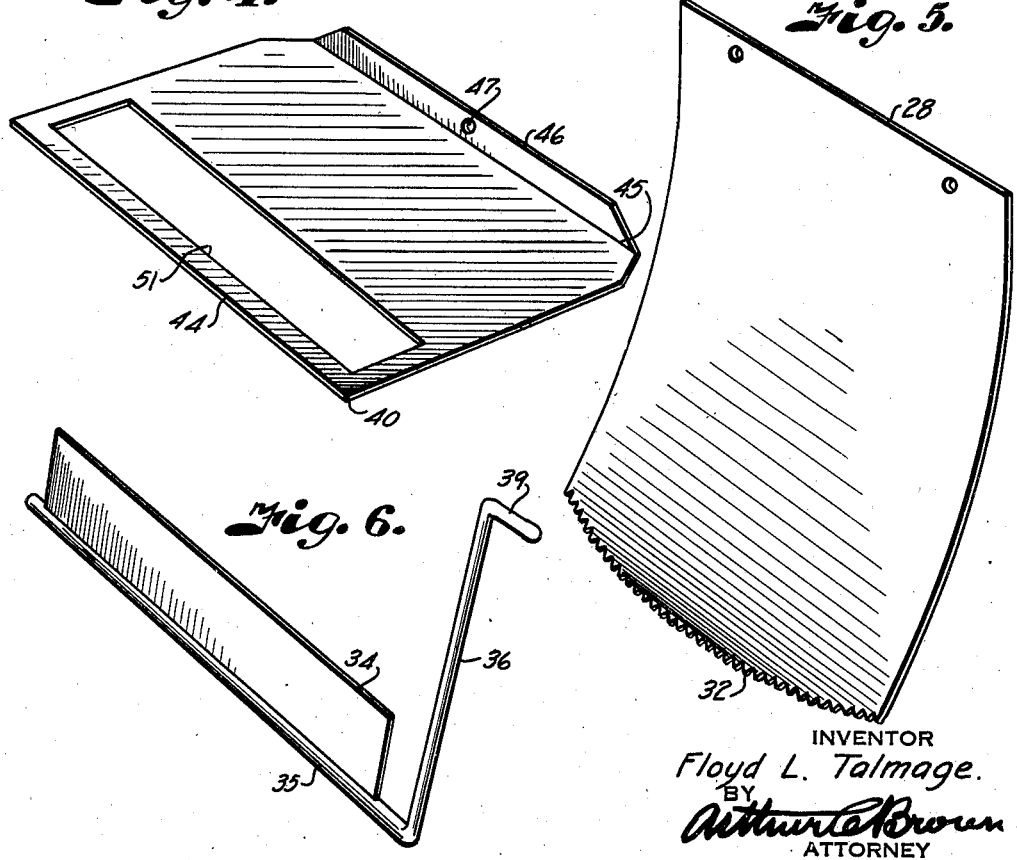
INVENTOR
Floyd L. Talmage.
BY
ATTORNEY Patented Sept. 6, 1938

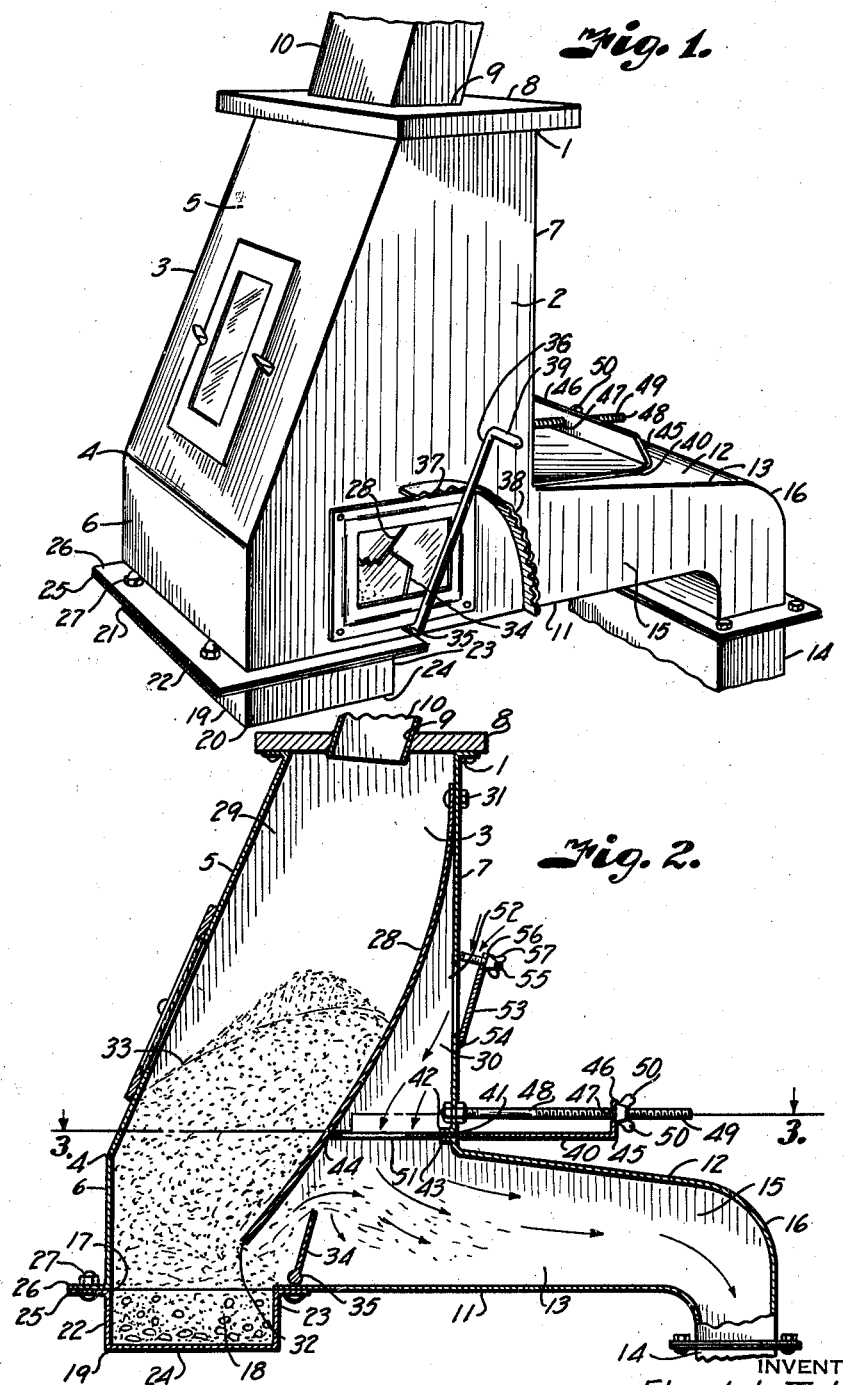

2,129,451

UNITED STATES PATENT OFFICE 2,129,451

FEEDER

Floyd L. Talmage, Kansas City, Kans., assignor to Ismert-Hincke Milling Company, Kansas City, Mo., a corporation of Kansas Application May 18, 1936, Serial No. 80,349

4 Claims. (Cl. 209—137)

This invention relates to feeders for regulating delivery of materials such as grain to a grinding mill or similar equipment wherein an air blast is drawn therethrough, and has for its principal object to provide a feeder wherein the material is delivered proportionately to its assimilation by the mill.

Other important objects of the invention are to provide a device of this character with means for regulating flow of the material by induction action of the air stream; to provide for ready adjustment of the air stream relatively to the material for varying its rate of feed; to provide for separation and entrapment of foreign objects carried in the material; and to provide for even flow and distribution of the material across the width of the feeder.

In accomplishing these and other objects of the invention, as hereinafter pointed out, I have provided improved details of structure, the preferred form of which is illustrated in the accompanying drawings, wherein:

Fig. 1 is a perspective view of a feeder embodying the features of the present invention.

Fig. 2 is a vertical section through the feeder.

Fig. 3 is a horizontal section on the line 3—3 of Fig. 2.

Fig. 4 is a detail perspective view of the air regulator slide and feeding stabilizer.

Fig. 5 is a detail perspective view of the feeder baffle.

Fig. 6 is a perspective view of the adjustable feed gate over which the material is drawn by the inducting action of the air stream.

Referring more in detail to the drawings:

1 designates a feeder constructed in accordance with the present invention and which is shown as comprising a housing having parallel side walls 2—3, a front wall 4 having an inclined upper portion 5, a perpendicular lower portion 6, and a rear wall 7 extending parallel with the perpendicular portion of the front wall, the front and rear walls being joined with the edges of the side walls by welding or the like. The top of the housing is closed by a horizontal plate 8 having an opening 9 through which a delivery spout 10 is directed into the interior of the housing. The housing is provided with a bottom plate 11 that is welded to the lower edges of the front and side walls and which cooperates with a plate 12 attached to the lower edge of the rear wall to form a conduit 13 through which the material is delivered from the feeder to the mill or other equipment designated 14, the side walls being provided with extensions 15 to form the sides of the conduit. The mill end of the conduit may terminate in a substantially angular bend as indicated at 16 to permit of its ready connection with the mill.

The forward portion of the bottom plate 11 has an opening 17 extending across the width of the feeder and wherethrough foreign objects, such as metal, rocks and the like carried in the material, are discharged into a trap 18. The trap 18 includes a substantially rectangular-shaped pan 19 having side and end walls 20—21 and 22—23 connected by a bottom 24 so that the bottom of the pan is downset from the plane of the plate 11. The upper edges of the side walls of the pan terminate in lateral flanges 25 that are bolted to lateral extensions 26 of the bottom plate as indicated at 27, whereby the pan may be removed to empty the entrapped material.

Fixed to the rear wall, at a point spaced slightly below the upper end thereof, is an adjustable baffle 28 comprising a rectangular sheet of flexible material having free fit between the side walls 2 and 3 of the feeder and which is of sufficient length to curve downwardly and forwardly over the trap 18 in spaced relation with the plate 11 to form a material outlet to the conduit. The baffle thus divides the feeder housing into a feeding chamber 29 located in communication with the spout 10, and an air inlet chamber 30 wherethrough air is passed to the mill, as later described. The upper end of the baffle is rigidly secured to the rear wall of the feeder by suitable fastening devices, such as bolts 31. The bottom edge of the baffle is provided with a plurality of V-shaped serrations 32 for distributing material that gravitates from the spout 10 across the width of the plate for collection in the bottom of the feeding chamber, as shown at 33. The serrations thus provide for even distribution of the material across the width of the feeder to assure even flow of the material through the conduit 13 under the inducing influence of the air stream. Cooperating with the lower edge of the baffle is an adjustable feeding gate 34 attached at its lower edge to a rock shaft 35 having its ends rotatably mounted in the side walls of the feeder and in close proximity to the bottom plate 11.

One end of the rock shaft terminates in a crank-shaped arm 36 that engages in the notches 37 of a rack segment 38 that is fixed to the outer face of the side wall 2. The free end of the lever forms a handle 39 by which the lever may be moved to selected notches in the rack for retaining the feeding gate in adjusted position relatively to the baffle. The baffle is also adjusted by means of a sliding regulator plate 40 that is projectible through a transverse slot 41 in the rear wall 7, the sides of the slot being flanged as at 42 and 43 to form extended bearings for the plate. The inner edge 44 of the plate abuts against the baffle, as clearly shown in Fig. 2, and the outer edge 45 terminates in a laterally extending flange 46 provided with an opening 47 to accommodate a guide rod 48 that is fixed to the lower portion of the rear wall and projects rearwardly in parallel relation with the directional movement of the plate.

The outer end of the guide rod is threaded as at 49 to accommodate a wing nut 50 whereby the plate may be retained in adjusted position against the inherent flexibility of the baffle. The regulating plate is provided with a substantially rectangular opening 51 to permit air to be drawn therethrough and across the top of the gate 34 into the conduit 13, the air being admitted to the feeder through an opening 52 that is provided in the rear wall and which has its effective capacity controlled by an air inlet door 53. The door is pivoted to one edge of the opening as indicated at 54 and is supported in a selected pivoted position relatively to the opening by means of a threaded stud 55, the stud being pivotally connected with the rear wall and has its threaded shank extending through a slot 56 in the plate to accommodate a wing nut 57 that forms an adjustable stop for the door whereby the angular position of the door may be adjusted to vary the effective capacity of the air inlet opening.

In using a feeder constructed and assembled as described, grain is delivered thereto through the spout 10 to gravitate down the baffle 8 and accumulate in the bottom of the feeding chamber. The grain, upon moving down the baffle, will be caused to roll so as to effect movement of foreign particles toward and into the trap 18. The feed gate and baffle plate are then adjusted to provide the desired opening therebetween so as to effect the required feed of material to the mill.

The baffle 28 is adjusted by manipulating the thumb screw 50 to move the control plate 40 in the proper direction, while the gate 34 is adjusted by moving the lever arm 36 to a selected notch in the rack 37. The air control door 53 is then adjusted to admit the desired amount of air to the mill. As the air stream moves across the discharge opening above the gate 34 and changes its direction of travel for flow to the mill, particles of the material are picked up thereby and carried over the gate in suspension in the air stream. The bottom of the baffle, being serrated, effects uniform distribution of the grain across the width of the feeder so as to be uniformly carried by the air stream drawn through the mill. When the trap becomes full of entrapped material the flow through the spout may be suspended and the trap removed to permit emptying thereof.

The amount of material fed through the feed opening is directly dependent upon the location of the opening 51 relatively to the material that is exposed between the baffle 28 and gate 34. The adjustment shown in Fig. 2 is for feeding very light material such as bran stock. With heavier materials the regulator plate 40 must be moved further into the housing so that the air stream is more positively directed relatively to the material exposed through the feed opening. Likewise this adjustment moves the baffle 28 to effect enlargement of the feed opening exposing more material to the action of the air stream. The gate 34 is also adjustable to cooperate with the diaphragm in regulating the amount of material exposed to the air which also controls the amount of material withdrawn from the feed chamber. With some materials the gate 34 might lie flatly against the bottom 11. It is thus apparent that there is an extremely wide adjustment of the parts so that the air stream may be selectively directed relatively to the exposed material to effect the desired feed.

From the foregoing, it is obvious that I have provided a simple feeder that effectively feeds the material to the mill proportionately to the requirements thereof, and that the flow may be selectively controlled to regulation of the quantity of air admitted through the opening 52 and by adjusting the baffle 28 and gate 34 respectively.

What I claim and desire to secure by Letters Patent is:

1. A feeder including a housing, a diaphragm dividing the housing into feed and air chambers and cooperating with a portion of the housing to form a feed opening, an outlet connection on the air chamber side of the housing, means for controlling admission of an air stream to the air chamber for movement across said feed opening and through the outlet connection whereby said air stream effects an inducing action on the material in the feed chamber to effect feed of the material through said outlet connection, and a plate slidable in the housing at a point intermediate the air control means and said outlet connection for selectively adjusting the diaphragm to vary the effective size of the feed opening and having an opening for the passage of said air stream.

2. A feeder including a housing, a diaphragm dividing the housing into feed and air chambers and cooperating with a portion of the housing to form a feed opening, an outlet connection on the air chamber side of the housing, means for selectively admitting an air stream to the air chamber for movement across said opening and through the outlet connection whereby said air stream effects an inducing action on the material in the feed chamber to effect feed of the material through said outlet connection, a plate slidable in the housing and engaging the diaphragm for selectively adjusting the diaphragm to vary the effective size of the feed opening and having an opening for the passage of said air stream, a threaded rod fixed to the housing and engaged with the plate, and an adjusting screw on the rod to selectively position the plate.

3. A feeder including a housing having a lateral outlet duct connected with the lower end thereof, a flexible diaphragm having its upper end fixed to the housing to provide separate feed and air chambers with the air chamber located on the side having the outlet duct and having its lower end spaced from the bottom of the housing to form a feed opening to said duct, an adjustable gate cooperating with the diaphragm to control the effective area of said feed opening, means for feeding material to the feed chamber of the housing for discharge through said feed opening, and a regulator plate slidably supported in the housing above said duct and having an opening for selectively directing an air stream across said feed opening to effect movement of material through said duct.

4. A feeder including a housing having a lateral outlet duct connected with the lower end thereof and an air inlet above said duct, a flexible diaphragm having its upper edge fixed to the housing at a point above said air inlet and having its lower end extending over the outlet duct and spaced from the bottom of the housing to form a feed opening to said duct, an adjustable feed gate extending upwardly from the bottom of the housing and cooperating with the diaphragm to control the effective area of said feed opening, means for feeding material to the housing on the side of the diaphragm opposed to said outlet duct for discharge through said feed opening, means connected with the housing for drawing an air stream across said feed opening to effect movement of the material through said duct, means for flexing the lower end of the flexible diaphragm away from said feed gate, and means connected with the housing and cooperating with the diaphragm for trapping foreign objects contained in said material.

FLOYD L. TALMAGE.